United States Patent
Ash et al.

(10) Patent No.: US 10,394,713 B2
(45) Date of Patent: Aug. 27, 2019

(54) SELECTING RESOURCES TO MAKE AVAILABLE IN LOCAL QUEUES FOR PROCESSORS TO USE

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 402 days.

(21) Appl. No.: 15/166,167

(22) Filed: May 26, 2016

(65) Prior Publication Data

US 2017/0344265 A1 Nov. 30, 2017

(51) Int. Cl.
*G06F 3/06* (2006.01)
*G06F 9/50* (2006.01)
*G06F 12/084* (2016.01)

(52) U.S. Cl.
CPC .......... *G06F 12/084* (2013.01); *G06F 3/0611* (2013.01); *G06F 3/0658* (2013.01); *G06F 3/0671* (2013.01); *G06F 9/50* (2013.01); *G06F 3/0637* (2013.01)

(58) Field of Classification Search
CPC .... G06F 3/0611; G06F 3/0637; G06F 3/0658; G06F 3/0671; G06F 9/50; G06F 12/084
See application file for complete search history.

(56) References Cited

U.S. PATENT DOCUMENTS

| | | | |
|---|---|---|---|
| 2006/0259733 A1* | 11/2006 | Yamazaki | G06F 12/0842 711/173 |
| 2009/0049443 A1 | 2/2009 | Powers et al. | |
| 2010/0325637 A1 | 12/2010 | Radmilac et al. | |

(Continued)

FOREIGN PATENT DOCUMENTS

| WO | WO2005050446 A1 | 6/2005 |
|---|---|---|
| WO | WO2005059748 A3 | 2/2006 |
| WO | WO2014003611 A1 | 1/2014 |

OTHER PUBLICATIONS

G. Manimaran et al., "New Algorithms for Resource Reclaiming from Precedent Constrained Tasks in Multiprocessor Real Time Systems", Journal of Parallel and Distributed Computing, 1997, 17 pages.

(Continued)

*Primary Examiner* — Aracelis Ruiz
(74) *Attorney, Agent, or Firm* — David W. Victor; Konrad Raynes Davda & Victor LLP

(57) ABSTRACT

Provided are a computer program product, system, and method for selecting resources to make available in local queues for processors to use. Each processor of a plurality of processors maintains a queue of resources for the processor to use when needed for processor operations. One of processors is selected. The selected processor accesses at least one available resource and includes the accessed at least one resource in the queue of the selected processor.

22 Claims, 6 Drawing Sheets

(56) References Cited

U.S. PATENT DOCUMENTS

| | | | |
|---|---|---|---|
| 2012/0159502 A1* | 6/2012 | Levin | G06F 9/5016 |
| | | | 718/104 |
| 2013/0311999 A1 | 11/2013 | Fetterman et al. | |
| 2014/0337850 A1 | 11/2014 | Iniguez | |
| 2014/0372723 A1* | 12/2014 | Bobroff | G06F 12/023 |
| | | | 711/170 |
| 2017/0220390 A1* | 8/2017 | Jain | G06F 9/5027 |

OTHER PUBLICATIONS

Varisteas, G. et al.; "Resource management for task-based parallel programs over a multi-kernel.: Bias: Barrelfish inter-core adaptive scheduling", RESoLVE'12, Second workshop on Runtime Environments, Systems, Layering and Virtualized Environments, London UK, Mar. 3, 2012, Association for Computing Machinery (ACM), 2012.

* cited by examiner

SELECTING RESOURCES TO MAKE AVAILABLE IN LOCAL QUEUES FOR PROCESSORS TO USE

BACKGROUND OF THE INVENTION

1. Field of the Invention

The present invention relates to a computer program product, system, and method for selecting resources to make available in local queues for processors to use.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A storage controller using the cache may have multiple processors, such as central processing units on one or more cores, requiring cache segments in the cache to use for Input/Output ("I/O") operations. Each processor CPU may have its own local queue of available cache segments to use for I/O operations. The processor may access cache segments from a global queue maintaining available cache segments for all the processors to use and indicate those cache segments in the local queue of the processor to use. Once the local queue is empty, the CPU needs to obtain a lock for the global queue to access a batch of cache segments indicated in the global queue to add to the local queue to use for I/O operations. Further, if the local queue of the CPU is full, then the processor may need to take available cache segments indicated on the local queue to move to the global queue to make room in the local queue and to make those cache segments available in the global queue to other processors in the storage controller.

Described embodiments provide improved techniques for managing resources, such as cache segments, available for use by processors in a system.

SUMMARY

A first embodiment comprises a computer program product, system, and method for selecting resources to make available in local queues for processors to use. Each processor of a plurality of processors maintains a queue of resources for the processor to use when needed for processor operations. One of processors is selected. The selected processor accesses at least one available resource and includes the accessed at least one resource in the queue of the selected processor.

The first embodiment selects processors to access available resources to include in the queue of the processor so they are available for the processor to use to perform processor operations when needed. This is advantageous because the processors do not need a lock to access the resources in their own queue. By selecting processors to access available resources to include in their queue, the processors are provided resources in their queue to minimize the need of the processors to access resources from another location which may require a lock to access, which could introduce latency into the processor operations to wait for the lock.

The first embodiment can optionally additionally select one of the processors by selecting one of the processors based on a number of available resources indicated in queues of the processors. Selecting processors based on the number of available processors allows preferring selection of processors whose queues have a lower number of resources so the selected processor may include additional available resources in the queue to use to minimize the need for the processor to obtain a lock for a global queue to access available resources to use.

The first embodiment can optionally additionally maintain a free ready resource list indicating resources released by one of the processors, wherein the selected processor accesses the at least one resource by selecting at least one available resource indicated in the free ready resource list to indicate in the queue of the selected processor. The free ready resource list makes available to all the processors the resources released by the processors so that the selected processor may access available resources from the free ready resource list to include in the processor queue. In this way, released available resources released by all the processors are made available for each of the processors to access and include in their local queue.

A second embodiment provides a method, system, and computer program product for managing access to cache segments in a cache of a computer system. Each processor of a plurality of processors maintains a queue of available cache segments for the processor to use for an Input/Output task. One of the processors is selected and the selected processor accesses at least one available cache segment and includes the accessed at least one available cache segment in the queue of the selected processor.

The second embodiment selects processors to access available cache segments to include in the queue of the processor so they are available for the processor to use to perform Input/Output operations. This is advantageous because the processors do not need a lock to access the cache segments in their own queue. By selecting processors to access available cache segments to include in their queue, the processors are provided cache segments in their queue to minimize the need of the processors to access cache segments from another location, such as a global queue, which may require a lock to access, which could introduce latency into the processor operations to wait for the lock.

The second embodiment can optionally additionally maintain a least recently used (LRU) demote ready list indicating available cache segments ready to demote from the cache, wherein the selected processor demotes the available cache segments indicated in the LRU demote ready list, and wherein the selected processor adds the demoted available cache segment in the queue for the selected processor. The LRU demote ready list makes available to all the processors the cache segments released by the processors so that the selected processor may access available cache segments from the demote ready list to include in the processor queue. In this way, released available cache segments released by all the processors are made available for each of the processors to access and include in their local queue.

DETAILED DESCRIPTION

Processors often have access to a local queue of available resources, such as indicated cache segments, in a local cache, such as an L1 cache. Processors do not need to obtain a lock to access items in their local cache. However, if the local queue runs out of resources a processor needs for performing operations, then the processor must obtain a lock to a global queue from which it can access more resources to use, such as cache segments. Further, if the local queue fills, the processor must also obtain a lock on the global queue to return resources, such as cache segments, indicated in the local queue to make room in the local queue. Because multiple processors may be accessing the global queue to obtain resources, processors may experience latency delays in obtaining the lock, which will introduce latency for their task processing as they wait to obtain a lock for the global queue.

Described embodiments provide techniques to reduce lock latency for a global queue by optimizing processor operations with respect to their local queues in a manner that maintains a sufficient number of available resources, such as cache segments, in the local queue to minimize or reduce the need for the processor to access the global queue to access or return resources. Described embodiments provide dispatching techniques to select processors to process a list of available resources, such as a demote ready least recently used (LRU) list of cache segments, where the selected processor processing the list will add the processed available resources from the list to the local queue where they are available for use by the processor. The dispatch technique will favor selecting processors having a local queue with relatively fewer available resources to reduce the likelihood that the local queue will become empty and cause the processor to access the global queue to obtain more resources, which introduces lock latency to the processor operations. Further, described embodiments avoid selecting processors whose local queue is full or has a relatively high number of available resources to avoid the processor having to return indication of available resources to the global queue to make room in the local queue, which also requires obtaining the global queue lock and experiencing lock latency.

Figure 1:
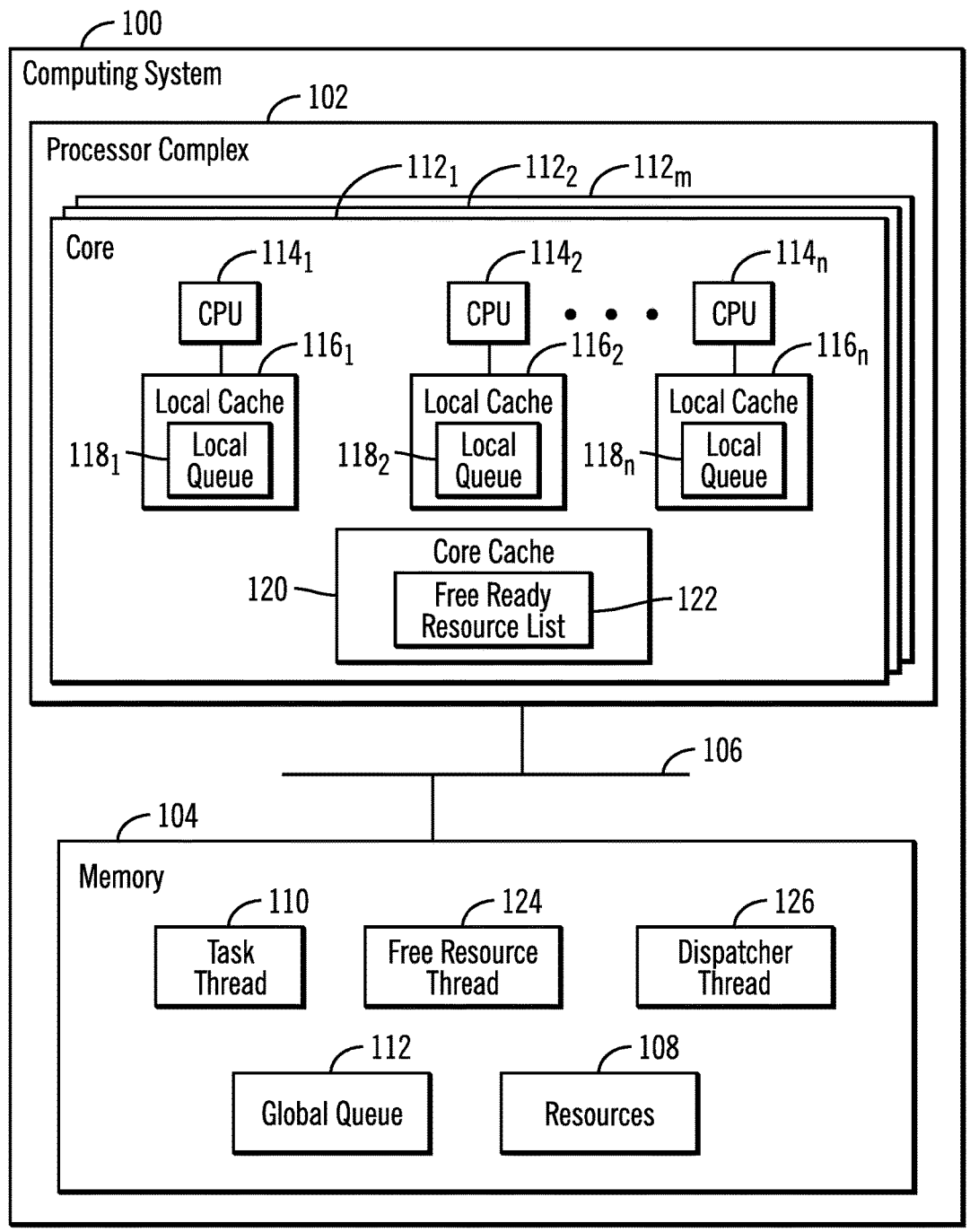
FIG. 1 illustrates an embodiment of a computing environment.

FIG. 1 illustrates an embodiment of a computing system 100 having a processor complex 102 that may access a memory 104 over a system bus 106 to access resources 108 in the memory 104. The resources may comprise various types of resources, such as cache segments in a cache, log spaces in a database and any other process a task thread 110 executing in the processor complex 102 can access, consume, and release. A global queue 112 indicates resources 108 that are available for use by the processor complex 102.

The processor complex 102 may include a plurality of processing cores $112_1 \ldots 112_m$, where each core $104_i$, as shown with respect to core $104_1$, includes a plurality of central processing units (CPUs) $114_1, 114_2 \ldots 114_n$, also referred to herein as processors or processing units. Each of the CPUs $114_1, 114_2 \ldots 114_n$ include a local cache $116_1, 116_2 \ldots 116_n$, such as an L1 cache, in which information used just by the corresponding CPU $114_1, 114_2 \ldots 114_n$ is maintained, including a local queue $118_1, 118_2 \ldots 118_n$. A CPU $114_1, 114_2 \ldots 114_n$ does not need to obtain a lock to access items in its local cache $116_1, 116_2 \ldots 116_n$, including the local queue $118_1, 118_2 \ldots 118_n$, respectively. Thus, there is no lock latency for a CPU to access resources in its own local queue. In described embodiments, each of the local queues $118_1, 118_2 \ldots 118_n$ comprises a list of available resources 108 available to a task tread 110 being executed by the CPUs $114_1, 114_2 \ldots 114_n$ to process the resources 108. The global queue 112 may be accessed by CPUs $114_1, 114_2 \ldots 114_n$ on any of the cores $112_1 \ldots 112_m$ to return available resources 108 to the global queue 112 or obtain available resources 108 to consume.

Each core 112, may further include a shared core cache 120, such as an L2 cache, shared by the CPUs $114_1, 114_2 \ldots 114_n$ on the core $112_i$, that includes a free ready resource list 122 of resources 108 released by CPUs $114_1, 114_2 \ldots 114_n$ using the resource 108. Available resources indicated in the free ready resource list 122 may not be included in the local queues $118_1, 118_2 \ldots 118_n$, and available resources are accessed from the free ready resource list 122 to include in the local queues $118_1, 118_2 \ldots 118_n$. A CPU $114_D$ comprising one of the CPUs $114_1, 114_2 \ldots 114_n$ executes a dispatcher thread 126 to select a CPU $114_S$, comprising one of the CPUs $114_1, 114_2 \ldots 114_n$, to execute a free resource thread 124 to access resources in the free ready resource list 122 to make available and add to the local queue $118_S$ of the selected CPU $114_S$ executing the free resource thread 124.

The term "processor" as used herein that executes the threads 110, 124, 126 may comprise a CPU $114_1, 114_2 \ldots 114_n$ in one or more cores in one or more integrated circuit dies. Further, a "processor" may comprise a CPU or processor implemented in a separate integrated circuit die. Still further, a "processor" may comprise a core or comprise a virtual processor, where each processor may independently execute threads.

Figure 2:
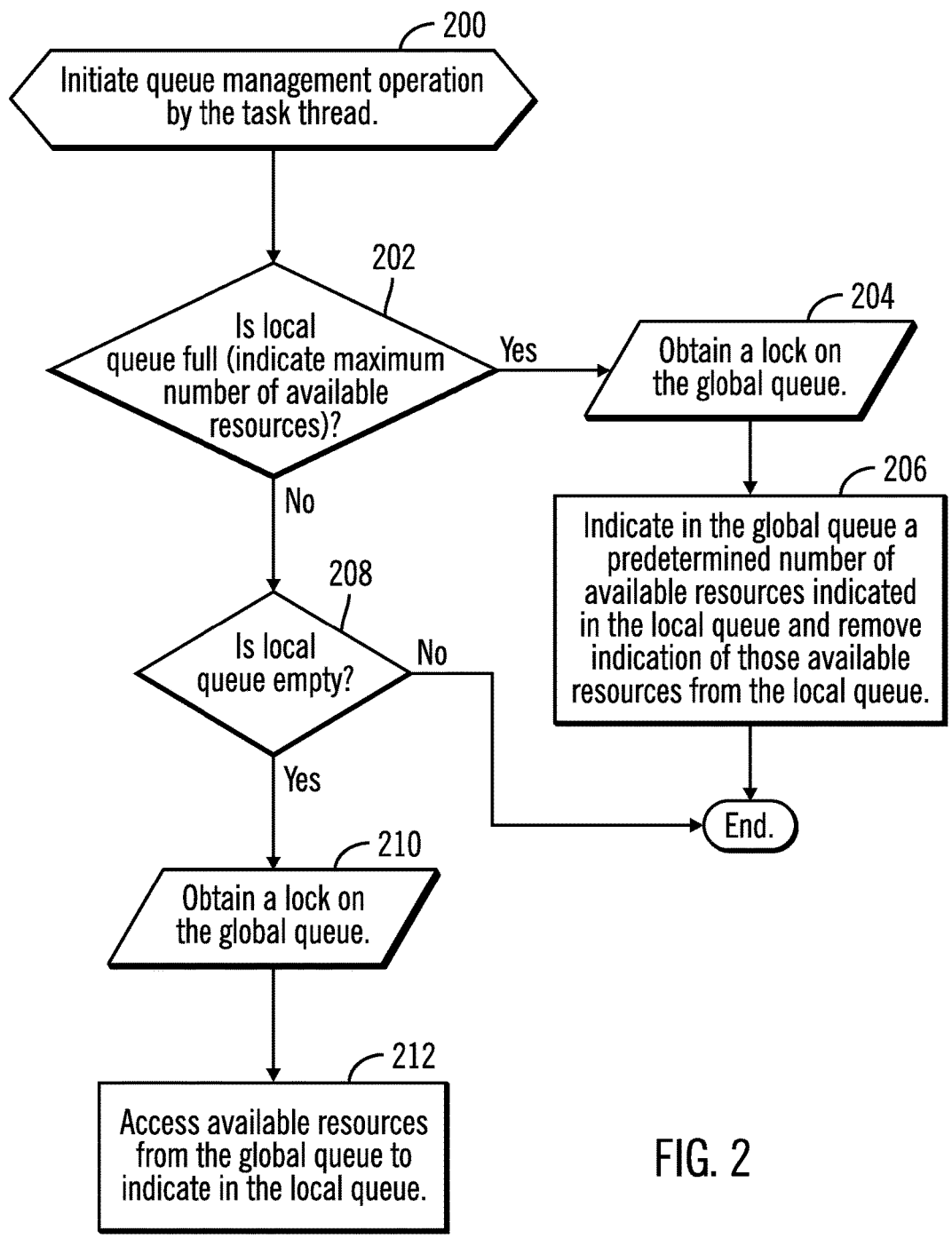
FIG. 2 illustrates an embodiment of operations to manage a local queue used by a processor.

FIG. 2 illustrates an embodiment of operations performed by the task thread 110 executed by a processor, such as one of the CPUs $114_1, 114_2 \ldots 114_n$. Upon initiating (at block 200) a queue management operation, the processor determines whether its local queue $118_1, 118_2 \ldots 118_n$ is full, or indicates a maximum number of available resources. If so, then the processor obtains (at block 204) a lock on the global queue 112 and indicates (at block 206) in the global queue 112 a predetermined number of available resources indicated in the local queue $118_i$ and removes indication of those available resources from the local queue $118_i$ to indicate in the global queue 112. The resources 108 moved to the global queue 112 are available for any other processors, e.g., CPUs $114_1, 114_2 \ldots 114_n$ in any cores $112_1, \ldots 112_m$, to access if needed.

If (at block 202) the local queue $118_i$ is not full and if (at block 208) the local queue $118_i$ is empty, i.e., has no or below a threshold number of available resources, then the processor obtains (at block 210) a lock on the global queue 112 to access (at block 212) available resources 108 from the global queue 112. Upon obtaining the lock, the task thread 110 accesses (at block 212) available resources from the global queue 112 to indicate in the local queue $118_i$ to make available to the processor executing the task thread 110. If (at block 208) the local queue $118_i$ is not empty, then control ends because the local queue may receive more resources when the dispatcher thread 126 runs, thus avoiding the need to access the lock to the global queue 112 to obtain more resources.

A processor processing the task thread 110 would remove a resource to use from the local queue $118_i$ to consume for the operation. Once the resource 118 has been used, then a separate process may add the used resource to the free ready resource list 122 once the resource is ready to be reused.

Figure 3:
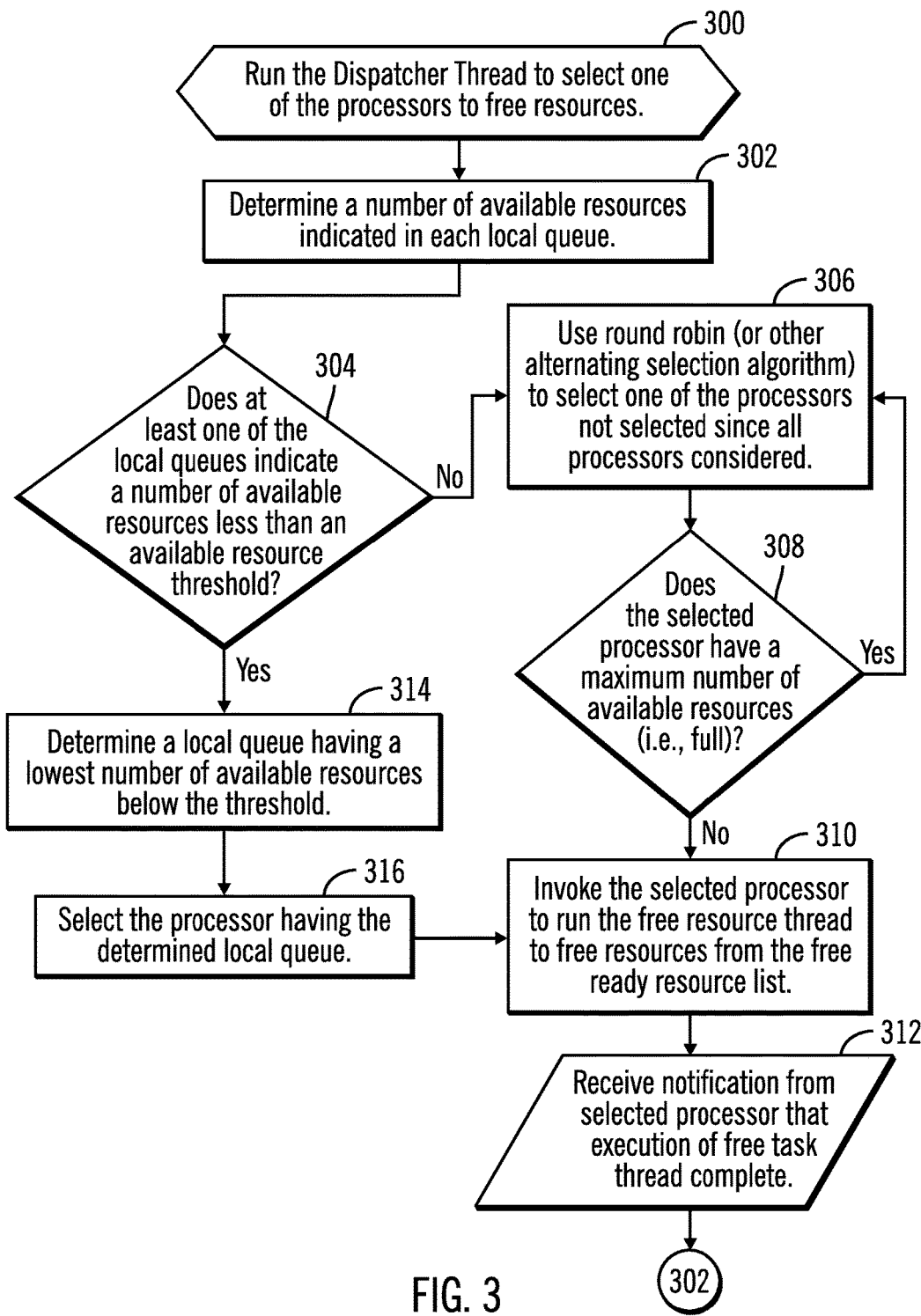
FIG. 3 illustrates an embodiment of operations of a dispatcher thread to select a processor to access available resources.

FIG. 3 illustrates an embodiment of operations performed by a dispatcher thread 126 executed by one of the processors, such as CPU $114_D$, per core $112_1, \ldots 112_m$, to select one of the other processors, such as one of the other CPUs $114_S$, in the core to process resources indicated in the free ready resource list 122. Upon invoking (at block 300) the dispatcher thread 126, the dispatcher thread 126 determines (at blocks 302) a number of available resources in each local queue $118_1, 118_2 \ldots 118_n$, such as in one of the cores $112_i$. If (at block 304) none of the local queues $118_1, 118_2 \ldots 118_n$ have a number of available resources 108 less than an available resource threshold, i.e., all the local queues have a relatively high number of indicated resources, then the dispatcher thread 126 uses (at block 306) a round robin or other alternating selection algorithm to select one of the processors, e.g., CPUs $114_1, 114_2 \ldots 114_n$, not selected since all processors have been considered. If (at block 308) the selected processor has a maximum number of available resources in its local queue $118_S$, such as is full, then the dispatcher thread 126 uses (at block 306) round robin (or other alternating selection algorithm) to select another one of the processors not selected since all processors were considered. If (at block 308) the local queue $118_S$ of the selected processor is not full, then the dispatcher thread 126 invokes (at block 310) the selected processor, e.g., $CPU_S$, to run the free resource thread 124 to access resources 108 from the free ready resource list 122 to add to the local queue $118_S$ of the selected processor running the free resource thread 124. Upon receiving (at block 312) notification that the selected processor completed executing the free resource thread 124, such as processed a predetermined number of resources indicated in the free ready resource list 122, control proceeds back to block 302 to select another processor to execute the free resource thread 124.

If (at block 304) at least one of the local queue $118_1, 118_2 \ldots 118_n$ indicates a number of available resources less than an available resource threshold, then the dispatcher thread 126 determines (at block 314) one of the local queues $118_1, 118_2 \ldots 118_n$ having a lowest number of available resources 108 below the threshold, which may be the only local queue indicating resources below the threshold. The dispatcher thread 126 selects (at block 316) the processor, e.g., CPU $114_S$, for the determined local queue $118_S$ and proceeds to block 310 to run the free resource thread 124.

With the described embodiments of FIG. 3, the dispatcher thread 126 selects one of the processors having a relatively low number of available resources in its local queue $118_S$ to run the free resource thread 124 so that it may both process the free ready resource list 122 and refresh its local queue $118_S$ with new available resources that are then available for the processor to use when needed. Using a selection technique that favors adding free resources to local queues $118_1, 118_2 \ldots 118_n$ that have a relatively low number of available resources reduces the likelihood that the processors for the local queues $118_1, 118_2 \ldots 118_n$ have to turn to the global queue 112 to access resources for use by the task thread 110 being executed by the processor. Further, avoiding selection of processors, e.g., $114_1, 114_2 \ldots 114_n$, having local queues $118_1, 118_2 \ldots 118_n$ that have a relatively high number of available resources reduces the likelihood of the processor trying to add free resources to its local queue $118_S$ when full which would necessitate that the processor, e.g., $CPU_S$, return resources in its full local queue $118_S$ to the global queue 112. In this way, the dispatcher thread 126 reduces the likelihood that the processors need to obtain a lock to access the global queue 112 to retrieve or return free resources, thus reducing latencies introduced by waiting for the global queue 112 lock, which could result in latencies in task thread 110 processing while the processor waits to access the global queue 112.

Figure 4:
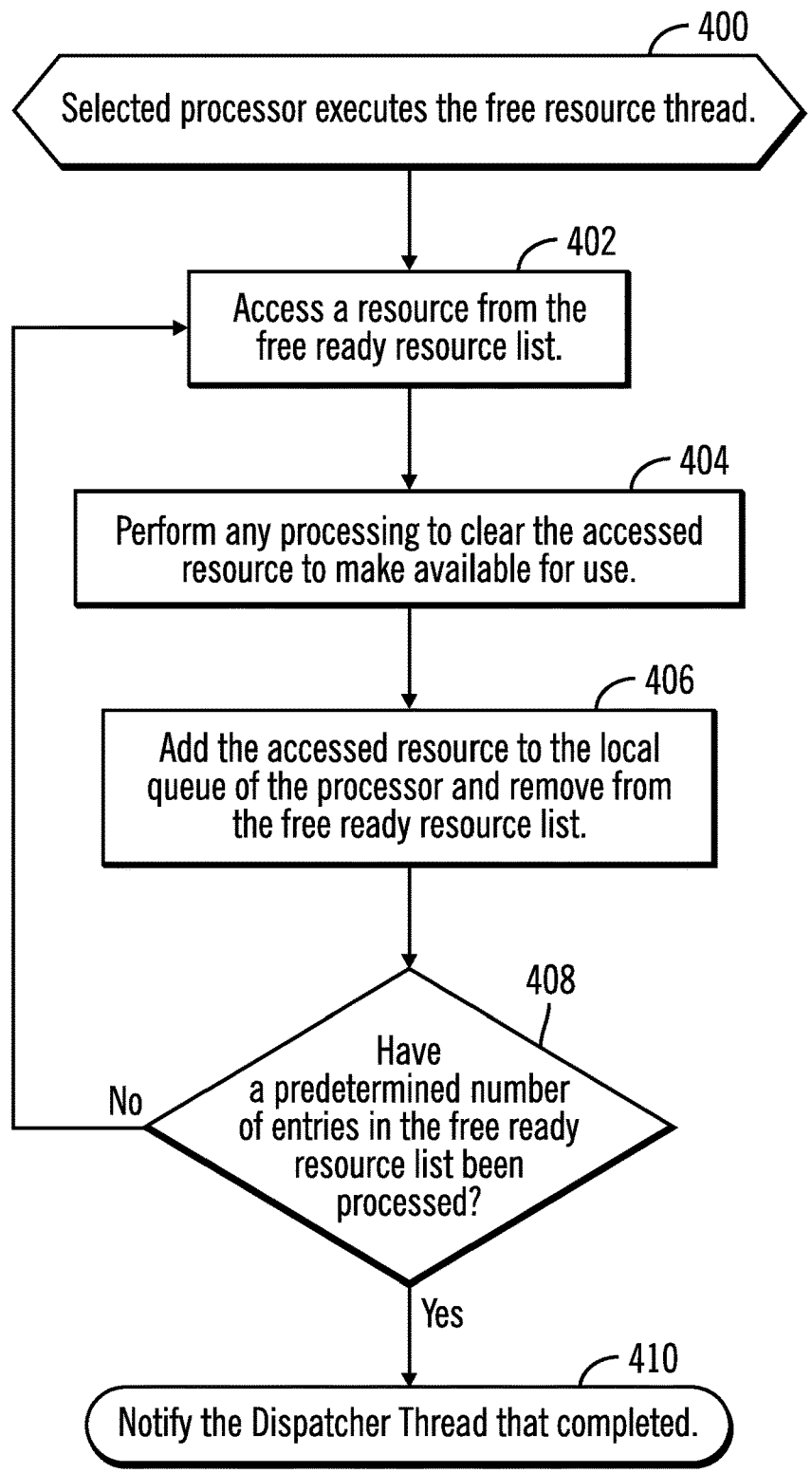
FIG. 4 illustrates an embodiment of operations for a processor selected by the dispatcher thread to access available resources.

FIG. 4 illustrates an embodiment of operations performed by a processor, e.g., $CPU_S$, selected to execute the free resource thread 124. Upon initiating processing (at block 400) of the free resource thread 124, a resource 108 is accessed (at block 402) from the free ready resource list 122 and the free resource thread 124 performs (at block 404) any necessary processing to clear the accessed resource to make available for use, such as remote indication of the accessed resource from the free ready resource list 122. The accessed resource is added (at block 406) to the local queue $118_S$ of the processor, e.g., CPU $114_S$, executing the free resource thread 124 and the resource is removed from the free ready resource list 122. If (at block 408) a predetermined number of entries in the free ready resource list 122 have been processed, then the dispatcher thread 126 is notified that the processing of the free ready resource list 122 has completed. If (at block 408) the predetermined number of entries have not been processed, then control returns to block 402 to access a next resource from the free ready resource list 122.

With the operations of FIG. 4, the processor, e.g., CPU $114_S$, executing the free resource thread 124 accesses available resources from the free ready resource list 122 to add to its own local queue $118_S$ to be available for use by the selected processor, e.g., $CPU_S$, when subsequently executing the task thread 110 to consume the resource 108. Adding resources to the local queue $118_S$ from the free ready resource list 122, reduces the likelihood that the processor executing the free resource thread 124 will have to obtain a lock to the global queue 112 to access additional resources when needed, thereby avoiding lock related latencies.

Figure 5:
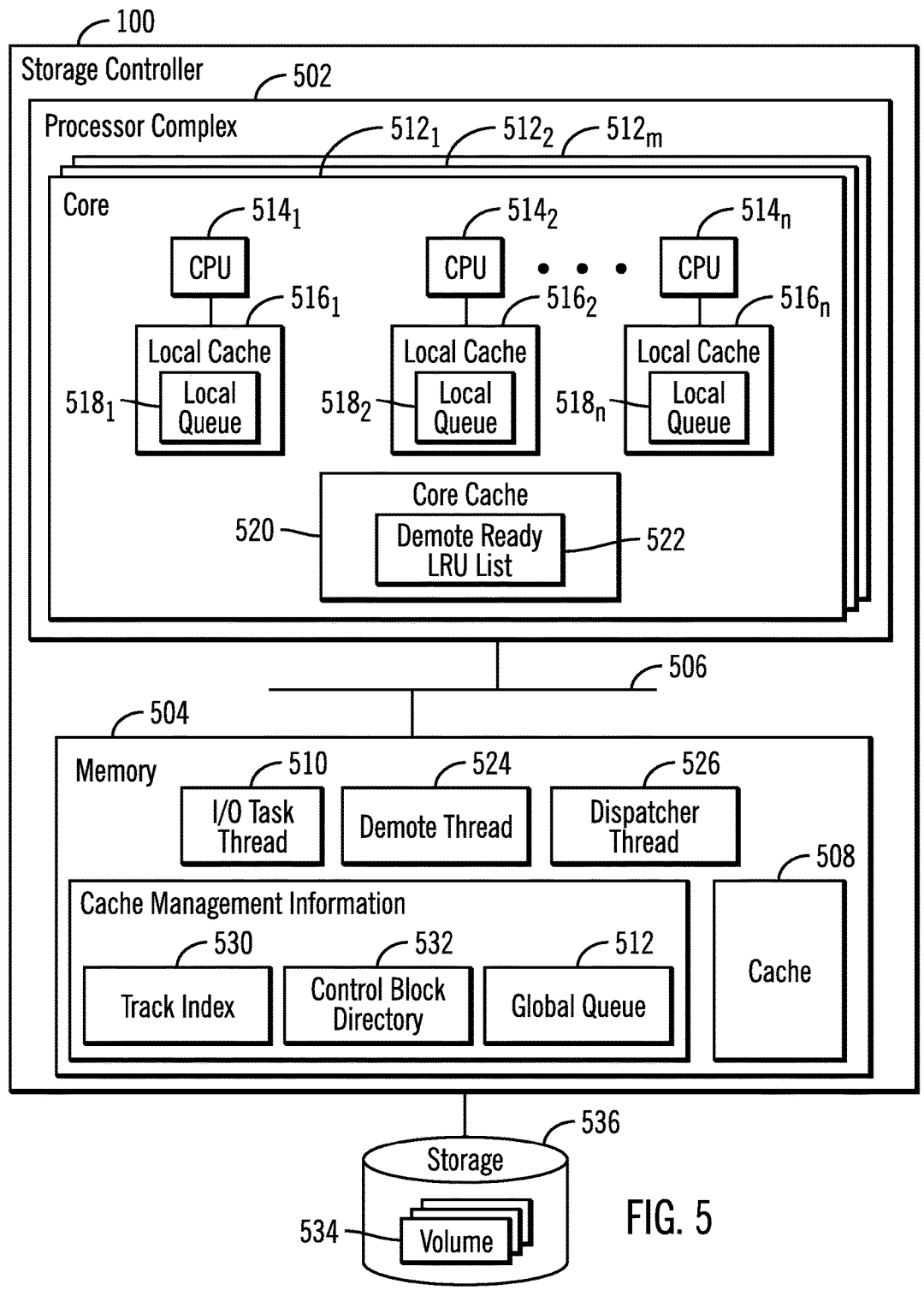
FIG. 5 illustrates an embodiment of a storage controller and cache computing environment.

FIG. 5 illustrates an implementation of the computing system 100 of FIG. 1 as a storage controller 500 having a processor complex 502, including cores $512_1, 512_2 \ldots 512_m$, each having CPUs $514_1, 514_2 \ldots 514_n$, local caches $516_1, 516_2 \ldots 516_n$, and local queues $518_1, 518_2 \ldots 518_n$, a memory 504, a bus 506, and a core cache 520 as described with respect to the corresponding elements in FIG. 1, including elements 100, 102, $114_1, 114_2 \ldots 114_n, 116_1, 116_2 \ldots 116_n, 118_1, 118_2 \ldots 118_n, 104, 106,$ and 120. In FIG. 5, the resource comprises cache segments in a cache 508 and the global queue 512 comprises a list of cache segments in the cache 508 that are available for use by I/O task threads 510 being executed by the processors, e.g., CPUs $514_1, 514_2 \ldots 514_n$. The core cache 520 maintains a demote ready Least Recently Used (LRU) list 522 indicating cache segments determined from active LRU lists (not shown) to have unmodified data that are ready to be demoted from the cache 508. The dispatcher thread 526 may perform the operations of FIG. 3 to select a processor to execute the demote thread 524 to demote cache segments from the cache 508 and indicate the demoted cache segments in the local queue $518_S$ of the selected processor, e.g., $514_S$, so that they may be available for use when the selected processor subsequently executes the I/O task thread 510.

The storage controller 500 further maintains a track index 530 providing an index of tracks in the cache 508 to cache control blocks in a control block directory 532 including the cache control blocks, where there is one cache control block for each track in the cache 508 providing metadata on the track in the cache 508. The track index 530 associates tracks with the cache control blocks providing information on the tracks in the cache. The cache 508 caches tracks in volumes 534 in a storage 536. A track may comprise any unit of data configured in the storage 538, such as a track, Logical Block Address (LBA), storage cell, group of cells (e.g., column, row or array of cells), sector, segment, etc., which may be part of a larger grouping of tracks, such as a volume, logical device, etc.

The storage 536 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memories 104, 504 may comprise a suitable volatile or non-volatile memory devices, including those described above with respect to the storage.

The described embodiments provide techniques for populating local queues used by processors with available resources, such as cache segments, that are available for use by the processors without having to obtain a lock from a global queue which may result in lock related latency. Further, those processors having queues that have available resources, such as cache segments, above a threshold, will be less likely to be selected to demote cache segments to add to their local queues to avoid the processor running the demote thread, or free resource thread, from having to return available resources in the local queue to the global queue, which would result in lock latency.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
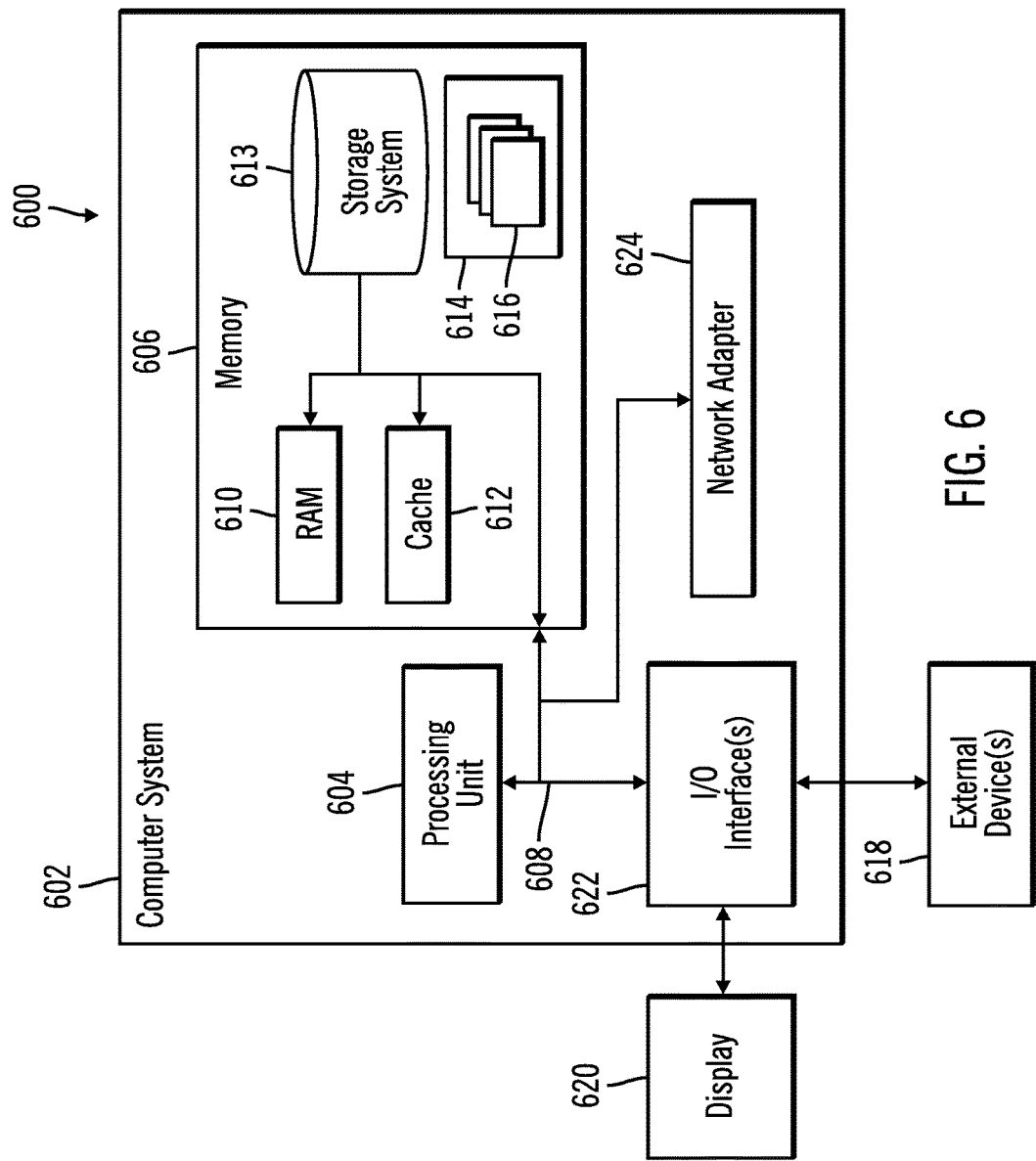
FIG. 6 illustrates a computing environment in which the components of FIGS. 1 and 5 may be implemented.

The computing system 100 and storage controller 500 of FIGS. 1 and 5, respectively, may further include components as described with respect to a computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing access to resources in a computer system, the computer program product comprising a computer readable storage medium having computer readable program code embodied therein that when executed performs operations, the operations comprising:

maintaining, by each processor of a plurality of processors, a queue of resources for the processor to use when needed for processor operations;

maintaining a global queue indicating available resources available for use by the processors;

in response to the queue for one of the processors indicating no available resources, obtaining, by the processor for that queue having no available resources, a lock for the global queue to access available resources from the global queue to indicate in the queue, having no available resources, as available for use by the processor;

in response to the queue for one of the processors indicating a maximum number of available resources, obtaining, by the processor for the queue having the maximum number of available resources, the lock to the global queue;

indicating in the global queue a plurality of the available resources indicated in the queue having the maximum number of available resources to reduce a number of the available resources indicated in the queue;

selecting one of the processors;

accessing, by the selected processor, at least one available resource; and including the accessed at least one available resource in the queue of the selected processor.

2. The computer program product of claim 1, wherein the operations further comprise alternating selection of the processor to access the at least one available resource.

3. The computer program product of claim 1, wherein the selecting one of the processors comprises selecting one of the processors based on a number of resources indicated in queues of the processors.

4. The computer program product of claim 1, wherein the selecting one of the processors comprises:

determining whether queues of the processors have a number of available resources below an available resource threshold, wherein the selecting one of the processors is based on the number of available resources in the queues that is below the available resource threshold.

5. The computer program product of claim 4, wherein if the processors have queues with the number of available resources below the available resource threshold, then the selecting one of the processors comprises selecting the processor whose queue has a lowest number of available resources below the available resource threshold.

6. The computer program product of claim 4, wherein if none of the queues for the processors have a number of available resources below the available resource threshold, then the selecting one of the processors comprises selecting the processor using a round robin selection technique to select one of the processors whose queue does not have a maximum number of available resources indicated in the queue.

7. The computer program product of claim 1, wherein the operations further comprise:

maintaining a free ready resource list indicating available resources released by one of the processors, wherein the selected processor accesses the at least one available resource by accessing at least one available resource indicated in the free ready resource list to indicate in the queue of the selected processor.

8. The computer program product of claim 7, wherein there are a plurality of cores, wherein each of the cores includes a plurality of processors, wherein each of the processors comprise computer processing units in one of the cores, wherein a free ready resource list is maintained for each of the cores, wherein the selected processor accesses the available resources by processing the resources indicated in the free ready resource list to indicate in the queue for the selected processor.

9. A computer program product for managing access to cache segments in a cache of a computer system, the computer program product comprising a computer readable storage medium having computer readable program code embodied therein that when executed performs operations, the operations comprising:

maintaining, by each processor of a plurality of processors, a queue of resources for the processor to use when needed for an Input/Output task;

maintaining a global queue indicating available resources available for use by the processors;

in response to the queue for one of the processors indicating no available resources, obtaining, by the processor for that queue having no available resources, a lock for the global queue to access available resources from the global queue to indicate in the queue, having no available resources, as available for use by the processor;

in response to the queue for one of the processors indicating a maximum number of available resources, obtaining, by the processor for the queue having the maximum number of available resources, the lock to the global queue;

indicating in the global queue a plurality of the available resources indicated in the queue having the maximum number of available resources to reduce a number of the available resources indicated in the queue;

selecting one of the processors;

accessing, by the selected processor, at least one available cache segment; and including the accessed at least one available cache segment in the queue of the selected processor.

10. The computer program product of claim 9, wherein the operations further comprise:

maintaining a least recently used (LRU) demote ready list indicating available cache segments ready to demote from the cache, wherein the selected processor demotes the available cache segments indicated in the LRU demote ready list, and wherein the selected processor adds the demoted available cache segment in the queue for the selected processor.

11. The computer program product of claim 9, wherein the computer system includes a plurality of cores, wherein each core includes a plurality of the processors, wherein each of the processors comprise computer processing units in one of the cores, wherein one LRU demote ready list is maintained for each of the cores for use by the processors in the core to select cache segments from the LRU demote ready list to demote from the cache and indicate in the queue for the processor demoting the cache segment.

12. A system, comprising:

a plurality of processors;

a computer readable medium having computer readable program code embodied therein that when executed performs operations, the operations comprising:

maintaining, by each processor of a plurality of processors, a queue of resources for the processor to use when needed for processor operations;

maintaining a global queue indicating available resources available for use by the processors;

in response to the queue for one of the processors indicating no available resources, obtaining, by the processor for that queue having no available resources, a lock for the global queue to access available resources from the global queue to indicate in the queue, having no available resources, as available for use by the processor;

in response to the queue for one of the processors indicating a maximum number of available resources, obtaining, by the processor for the queue having the maximum number of available resources, the lock to the global queue;

indicating in the global queue a plurality of the available resources indicated in the queue having the maximum number of available resources to reduce a number of the available resources indicated in the queue;

selecting one of the processors;

accessing, by the selected processor, at least one available resource; and including the accessed at least one available resource in the queue of the selected processor.

13. The system of claim 12, wherein the selecting one of the processors comprises selecting one of the processors based on a number of available resources indicated in queues of the processors.

14. The system of claim 12, wherein the selecting one of the processors comprises:

determining whether queues of the processors have a number of available resources below an available resource threshold, wherein the selecting one of the processors is based on the number of available resources in the queues that is below the available resource threshold.

15. The system of claim 12, wherein the operations further comprise:

maintaining a free ready resource list indicating available resources released by one of the processors, wherein the selected processor accesses the at least one available resource by accessing at least one available resource indicated in the free ready resource list to indicate in the queue of the selected processor.

16. The system of claim 15, wherein there are a plurality of cores, wherein each of the cores includes a plurality of processors, wherein each of the processors comprise computer processing units in one of the cores, wherein a free ready resource list is maintained for each of the cores, wherein the selected processor accesses the available resources by accessing the available resources indicated in the free ready resource list to indicate in the queue for the selected processor.

17. A system in communication with a storage comprising:

a plurality of processors;

a memory having a cache;

a computer readable storage medium having computer readable program code embodied therein that when executed performs operations, the operations comprising:

maintaining, by each processor of a plurality of processors, a queue of resources for the processor to use when needed for an Input/Output task;

maintaining a global queue indicating available resources available for use by the processors;

in response to the queue for one of the processors indicating no available resources, obtaining, by the processor for that queue having no available resources, a lock for the global queue to access available resources from the global queue to indicate in the queue, having no available resources, as available for use by the processor;

in response to the queue for one of the processors indicating a maximum number of available resources, obtaining, by the processor for the queue having the maximum number of available resources, the lock to the global queue;

indicating in the global queue a plurality of the available resources indicated in the queue having the maximum number of available resources to reduce a number of the available resources indicated in the queue;

selecting one of the processors;

accessing, by the selected processor, at least one available cache segment; and including the accessed at least one available cache segment in the queue of the selected processor.

18. The system of claim 17, wherein the operations further comprise:

maintaining a least recently used (LRU) demote ready list indicating available cache segments ready to demote from the cache, wherein the selected processor demotes the available cache segments indicated in the LRU demote ready list, and wherein the selected processor adds the demoted available cache segment in the queue for the selected processor.

19. A method for managing access to resources in a computer system, comprising:

maintaining, by each processor of a plurality of processors, a queue of resources for the processor to use when needed for processor operations;

maintaining a global queue indicating available resources available for use by the processors;

in response to the queue for one of the processors indicating no available resources, obtaining, by the processor for that queue having no available resources, a lock for the global queue to access available resources from the global queue to indicate in the queue, having no available resources, as available for use by the processor;

in response to the queue for one of the processors indicating a maximum number of available resources, obtaining, by the processor for the queue having the maximum number of available resources, the lock to the global queue;

indicating in the global queue a plurality of the available resources indicated in the queue having the maximum number of available resources to reduce a number of the available resources indicated in the queue;

selecting one of the processors;

accessing, by the selected processor, at least one available resource; and including the accessed at least one available resource in the queue of the selected processor.

20. The method of claim 19, wherein the selecting one of the processors comprises selecting one of the processors based on a number of available resources indicated in queues of the processors.

21. The method of claim 19, wherein the selecting one of the processors comprises:

determining whether queues of the processors have a number of available resources below an available resource threshold, wherein the selecting one of the processors is based on the number of available resources in the queues that is below the available resource threshold.

22. The method of claim 19, further comprising:

maintaining a free ready resource list indicating available resources released by one of the processors, wherein the selected processor accesses the at least one available resource by selecting at least one available resource indicated in the free ready resource list to indicate in the queue of the selected processor.

* * * * *